US006447892B1

(12) United States Patent
Hatley et al.

(10) Patent No.: US 6,447,892 B1
(45) Date of Patent: Sep. 10, 2002

(54) LIDDING FILM FOR MODIFIED ATMOSPHERE PACKAGING

(75) Inventors: Earl L. Hatley, Randolph; Robert R. Ting, Plainsboro, both of NJ (US); Alan Slotkin, Wincote; David J. Gibboni, Havertown, both of PA (US)

(73) Assignee: Honeywell International Inc., Morris Township, NJ (US)

( * ) Notice: Subject to any disclaimer, the term of this patent is extended or adjusted under 35 U.S.C. 154(b) by 0 days.

(21) Appl. No.: 09/576,470

(22) Filed: May 23, 2000

(51) Int. Cl.$^7$ .................. B32B 27/08; B32B 27/32; C09K 3/18
(52) U.S. Cl. .................. 428/218; 428/35.7; 428/220; 428/516; 523/169
(58) Field of Search .................. 428/35.7, 218, 428/516, 220; 523/169

(56) References Cited

U.S. PATENT DOCUMENTS

| | | | |
|---|---|---|---|
| 3,595,740 A | 7/1971 | Gerow | 161/254 |
| 3,949,114 A | 4/1976 | Viola et al. | 428/337 |
| 4,072,790 A * | 2/1978 | Creekmore et al. | 428/220 |
| 4,254,169 A | 3/1981 | Schroeder | 428/35 |
| 4,284,674 A | 8/1981 | Sheptak | 428/69 |
| 4,306,041 A | 12/1981 | Cozewith et al. | 526/65 |
| 4,405,667 A | 9/1983 | Christensen et al. | 428/35 |
| 4,640,852 A | 2/1987 | Ossian | 428/35 |
| 4,677,017 A | 6/1987 | DeAntonis et al. | 428/214 |
| 4,746,562 A | 5/1988 | Fant | 428/213 |
| 4,818,592 A | 4/1989 | Ossian | 428/216 |
| 4,826,955 A | 5/1989 | Akkapeddi et al. | 528/324 |
| 5,055,355 A | 10/1991 | DeAntonis et al. | 428/476.3 |
| 5,139,878 A | 8/1992 | Kim et al. | 428/421 |
| 5,154,789 A | 10/1992 | Ossian | 156/229 |
| 5,425,974 A | 6/1995 | von Widdern et al. | 428/354 |
| 5,482,770 A | 1/1996 | Bekele | 428/339 |
| 5,541,267 A | 7/1996 | Akkapeddi et al. | 525/432 |
| 5,547,765 A | 8/1996 | Degrassi et al. | 428/474.7 |
| 5,562,996 A | 10/1996 | Kuriu et al. | 428/474.4 |
| 5,645,788 A | 7/1997 | Bekele | 264/469 |
| 5,730,919 A * | 3/1998 | Wilfong et al. | 264/173.11 |
| 5,766,722 A | 6/1998 | Ciocca et al. | 428/516 |
| 5,766,772 A | 6/1998 | Ciocca et al. | 428/516 |
| 5,919,547 A | 7/1999 | Kocher et al. | 428/138 |
| 5,985,386 A | 11/1999 | von Widdern et al. | 428/34.8 |
| 6,046,254 A * | 4/2000 | Kneale | 523/169 |
| 6,060,136 A | 5/2000 | Patrick et al. | 428/35.2 |
| 6,221,470 B1 * | 4/2001 | Ciocca et al. | 428/218 |
| 6,251,510 B1 * | 6/2001 | Nagaoka et al. | 428/218 |

FOREIGN PATENT DOCUMENTS

| | | |
|---|---|---|
| EP | 0 692 374 | 1/1996 |
| WO | WO 95/00326 | 1/1995 |

* cited by examiner

Primary Examiner—Cynthia H. Kelly
Assistant Examiner—Kimberly T. Nguyen
(74) Attorney, Agent, or Firm—Roger H. Criss

(57) ABSTRACT

Improved packaging films, which are shrinkable, high gas barrier films containing an antifog composition for modified atmosphere packaging of foods and the like. The films are useful for producing a modified atmosphere package useful for the preservation and shelf life extension of food and non-food oxygen sensitive items.

38 Claims, No Drawings

LIDDING FILM FOR MODIFIED ATMOSPHERE PACKAGING

BACKGROUND OF THE INVENTION

1. Field of the Invention

The present invention relates to packaging films, or more particularly to shrinkable, high gas barrier films containing an antifog composition for modified atmosphere packaging of foods and the like. The films are useful for producing a modified atmosphere package useful for the preservation and shelf life extension of food and non-food oxygen sensitive items.

2. Description of the Related Art

Containers have long been used to store and transfer perishable food prior to sale at a market where it will be purchased by the consumer. After perishable foods, such as meats, fruits, and vegetables, are prepared, they are placed into containers to preserve those foods for as long as possible. Maximizing the time in which the food remains preserved in the containers minimizes the amount of spoilage.

The environment around which the food is preserved is an important factor in the preservation process. Not only is maintaining an adequate temperature important, but the molecular and chemical content of the gases surrounding the food is significant as well. By providing an appropriate gas content to the environment surrounding the food, the food can be better preserved when maintained at the proper temperature or even when it is exposed to variations in temperature. This gives the food producer some assurance that the food will be in an acceptable condition when it reaches the consumer.

Preferred modified atmosphere packaging systems for foods, including raw meats, exposes these foods to extremely low levels of oxygen because it is well known that the freshness of meat can be preserved longer under anaerobic conditions than under aerobic conditions. Maintaining low levels of oxygen minimizes the growth and multiplication of aerobic bacteria.

Many multilayered films for modified atmosphere packaging systems are known. In this regard, U.S. Pat. No. 5,919,547 shows a laminate which delaminates into a substantially gas-impermeable portion and a gas-permeable portion. U.S. Pat. No. 6,060,136 teaches a multilayer film having first and second outer layers and an inner layer. The first and second outer layers comprise a homogeneous ethylene/alpha-olefin copolymer and the inner layer comprises a thermoplastic elastomer. This film is not taught to be heat shrinkable. U.S. Pat. No. 5,766,772 describes multilayer heat-shrinkable film endowed with anti-fog properties having a different structure from this invention.

It would be advantageous to provide a multilayered packaging film which is heat shrinkable, sealable to a food container, an effective gas barrier and has effective antifog properties.

SUMMARY OF THE INVENTION

The invention provides a multilayered film which comprises a nylon film attached to a surface of an ethylene vinyl alcohol film and another nylon film attached to another surface of the ethylene vinyl alcohol film to form a composite; a surface of a polyolefin film attached to one of the nylon films via an intermediate adhesive, and an antifog composition on another surface of the polyolefin film or incorporated into the polyolefin film.

The invention also provides a process for producing a multilayered film which comprises coextruding a nylon film to a surface of an ethylene vinyl alcohol film and another nylon film to another surface of the ethylene vinyl alcohol film to form a composite; biaxially orienting the composite; laminating or coextruding a surface of a polyolefin film to one of the nylon films via an intermediate adhesive; and either applying an antifog composition onto another surface of the polyolefin film or incorporating an antifog composition into the polyolefin film.

The invention further provides a food package which comprises a container having an open portion and a multilayered film sealing the open portion; which multilayered film comprises a nylon film attached to a surface of an ethylene vinyl alcohol film and another nylon film attached to another surface of the ethylene vinyl alcohol film to form a composite; a surface of a polyolefin film attached to one of the nylon films via an intermediate adhesive, and an antifog composition on another surface of the polyolefin film or incorporated into the polyolefin film; the multilayered film being positioned such that the antifog composition is on the open portion.

The invention still further provides a multilayered film which comprises a shrinkable film attached to a surface of an oxygen barrier film and another shrinkable film attached to another surface of the oxygen barrier film to form a composite; a surface of a polyolefin film attached to one of the shrinkable films via an intermediate adhesive, and an antifog composition on another surface of the polyolefin film or incorporated into the polyolefin film.

The invention yet further provides a multilayered film which comprises a shrinkable film coated with an oxygen barrier coating and another shrinkable film attached to the oxygen barrier coating to form a composite; a surface of a polyolefin film attached to one of the shrinkable films via an intermediate adhesive, and an antifog composition on another surface of the polyolefin film or incorporated into the polyolefin film.

The multilayered packaging film of this invention is preferably heat shrinkable, sealable to a food container, an effective gas barrier and has effective antifog properties.

DETAILED DESCRIPTION OF THE PREFERRED EMBODIMENT

In the production of the multilayered film according to the invention, first a nylon film is attached to a surface of an ethylene vinyl alcohol film and another nylon film attached to another surface of the ethylene vinyl alcohol film to form a composite.

The preferred nylon is a homopolymer or copolymer is selected from aliphatic polyamides and aliphatic/aromatic polyamides having a molecular weight of from about 10,000 to about 100,000. General procedures useful for the preparation of polyamides are well known to the art. Useful diacids for making polyamides include dicarboxylic acids which are represented by the general formula

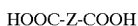

HOOC-Z-COOH wherein Z is representative of a divalent aliphatic radical containing at least 2 carbon atoms, such as adipic acid, sebacic acid, octadecanedioic acid, pimelic acid, suberic acid, azelaic acid, dodecanedioic acid, and glutaric acid. The dicarboxylic acids may be aliphatic acids, or aromatic acids such as isophthalic acid and terephthalic acid. Suitable diamines for making polyamides include those having the formula

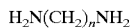

wherein n has an integer value of 1–16, and includes such compounds as trimethylenediamine, tetramethylenediamine, pentamethylenediamine, hexamethylenediamine, octamethylenediamine, decamethylenediamine, dodecamethylenediamine, hexadecamethylenediamine, aromatic diamines such as p-phenylenediamine, 4,4'-diaminodiphenyl ether, 4,4'-diaminodiphenyl sulphone, 4,4'-diaminodiphenylmethane, alkylated diamines such as 2,2-dimethylpentamethylenediamine, 2,2,-trimethylhexamethylenediamine, and 2,4,4 trimethylpentamethylenediamine, as well as cycloaliphatic diamines, such as diaminodicyclohexylmethane, and other compounds. Other useful diamines include heptamethylenediamine, nonamethylenediamine, and the like.

Useful polyamide homopolymers include poly(4-aminobutyric acid) (nylon 4), poly(6-aminohexanoic acid) (nylon 6, also known as poly(caprolactam)), poly(7-aminoheptanoic acid) (nylon 7), poly(8-aminooctanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12), as well as nylon 46, nylon 66 and nylon 69 and the like. Useful aliphatic polyamide copolymers include poly(hexamethylene adipamide) (nylon 6,6), poly(hexamethylene sebacamide) (nylon 6,10), poly(heptamethylene pimelamide) (nylon 7,7), poly(octamethylene suberamide) (nylon 8,8), poly(hexamethylene azelamide) (nylon 6,9), poly(nonamethylene azelamide) (nylon 9,9), poly(decamethylene azelamide) (nylon 10,9), caprolactam/hexamethylene adipamide copolymer (nylon 6,6/6), hexamethylene adipamide/caprolactam copolymer (nylon 6/6,6), trimethylene adipamide/hexamethylene azelaiamide copolymer (nylon trimethyl 6,2/6,2), hexamethylene adipamide-hexamethylene-azelaiamide caprolactam copolymer (nylon 6,6/6,9/6), poly(tetramethylenediamine-co-oxalic acid) (nylon 4,2), the polyamide of n-dodecanedioic acid and hexamethylenediamine (nylon 6,12), the polyamide of dodecamethylenediamine and n-dodecanedioic acid (nylon 12,12), as well as copolymers thereof and as well as other nylons which are not particularly delineated here.

Of these polyamides, preferred polyamides include nylon 6, nylon 6,6, nylon 6/6,6 as well as mixtures of the same. Of these, nylon 6 is most preferred.

Aliphatic polyamides used in the practice of this invention may be obtained from commercial sources or prepared in accordance with known preparatory techniques. For example, poly(caprolactam) can be obtained from Honeywell International Inc., Morristown, N.J. under the trademark CAPRON®.

Exemplary of aliphatic/aromatic polyamides include poly(tetramethylenediamine-co-isophthalic acid) (nylon 4,I), polyhexamethylene isophthalamide (nylon 6,I), hexamethylene adipamide/hexamethylene-isophthalamide (nylon 6,6/6I), hexamethylene adipamide/hexamethyleneterephthalamide (nylon 6,6/6T), poly (2,2,2-trimethyl hexamethylene terephthalamide), poly(m-xylylene adipamide) (MXD6), poly(p-xylylene adipamide), poly(hexamethylene terephthalamide), poly(dodecamethylene terephthalamide), polyamide 6T/6I, polyamide 6/MXDT/I, polyamide MXDI, and the like. Blends of two or more aliphatic/aromatic polyamides can also be used. Aliphatic/aromatic polyamides can be prepared by known preparative techniques or can be obtained from commercial sources. Other suitable polyamides are described in U.S. Pat. Nos. 4,826,955 and 5,541,267, which are incorporated herein by reference.

Ethylene vinyl alcohol compounds are also well known in the art and readily commercially available. Copolymers of ethylene and vinyl alcohol suitable for use in the present invention can be prepared by the methods disclosed in U.S. Pat. Nos. 3,510,464; 3,560,461; 3,847,845; 3,595,740 and 3,585,177. The ethylene vinyl alcohol copolymer can be a hydrolyzed ethylene vinyl acetate copolymer. The degree of hydrolysis can range from 85 to 99.5%. The ethylene vinyl alcohol copolymer preferably contains from 15 to 65 mol percent ethylene and more preferably 25 to 50 mol percent ethylene. Copolymers of lower than 15 mol percent ethylene tend to be difficult to extrude while those above 65 mol percent ethylene have reduced oxygen barrier performance. The term "ethylene/vinyl alcohol copolymer" or "EVOH" is intended to comprise also the hydrolyzed or saponified ethylene/vinyl acetate copolymers and refers to a vinyl alcohol copolymer having an ethylene comonomer, which may be obtained, for example, by the hydrolysis of an ethylene/vinyl acetate copolymer or by chemical reaction of ethylene monomers with vinyl alcohol. Ethylene vinyl alcohol copolymers are commercially available from a variety of sources.

The composite can be formed by any conventional technique for forming films, including lamination and coextrusion. The preferred method for making the composite is by coextrusion. For example, the polymeric material for the individual layers, are fed into infeed hoppers of a like number of extruders, each extruder handling the material for one or more of the layers. The melted and plasticated streams from the individual extruders are fed into a single manifold co-extrusion die. While in the die, the layers are juxtaposed and combined, then emerge from the die as a single multiple layer film of polymeric material. After exiting the die, the film is cast onto a first controlled temperature casting roll, passes around the first roll, and then onto a second controlled temperature roll, which is normally cooler than the first roll. The controlled temperature rolls largely control the rate of cooling of the film after it exits the die. In another method, the film forming apparatus may be one which is referred to in the art as a blown film apparatus and includes a multi-manifold circular die head for bubble blown film through which the plasticized film composition is forced and formed into a film bubble which may ultimately be collapsed and formed into a film. Processes of coextrusion to form film and sheet laminates are generally known. Alternatively the individual layers may first be formed as separate layers and then laminated together under heat and pressure with or without intermediate adhesive layers. Suitable coextrusion techniques are described in U.S. Pat. Nos. 5,139,878 and 4,677,017. Composites of nylon and ethylene vinyl alcohol are more fully described in U.S. Pat. No. 5,055,355 which is incorporated herein by reference.

Preferably the composite is then oriented. For the purposes of the present invention the term draw ratio is an indication of the increase in the dimension in the direction of draw. Preferably, in the present invention the film composite is drawn to a draw ratio of from 1.5:1 to 5:1 uniaxially in at least one direction, i.e. its longitudinal direction, its transverse direction or biaxially in each of its longitudinal and transverse directions. Generally, the film is drawn by passing it over a series of preheating and heating rolls. The heated film moves through a set of nip rolls downstream at a faster rate than the film entering the nip rolls at an upstream location. The change of rate is compensated for by stretching in the film. This results in dramatic improvements in barrier properties. Preferably, the composite film is biaxially oriented and is not heat set so that it is shrinkable both in its transverse and longitudinal directions.

In order to form the multilayered film of the invention, a surface of a polyolefin film is then attached to one of the nylon films via an intermediate adhesive. An antifog composition is either applied onto another surface of the polyolefin film or incorporated into the polyolefin film.

Suitable polyolefins may be comprised of poly α-olefin homopolymers and copolymers and blends thereof, preferably wherein the α-olefin monomers have from about 2 to about 10 and preferably from about 2 to about 6 carbon atoms. Non-limiting examples of suitable polyolefins are low density polyethylene (LDPE), linear low density polyethylene (LLDPE), Linear medium density polyethylene (LMDPE), Linear very-low density polyethylene (VMDPE), Linear ultra-low density polyethylene (UMDPE), high density polyethylene (HDPE), polypropylene (PP), syndiotactic polypropylene (SPP), propylene/ethylene copolymers, propylene/alpha-olefin copolymers or terpolymers, polyethylene interpolymers, i.e. copolymers of ethylene with alpha-olefins characterized by a narrow distribution of the molecular weights and obtained by means of polymerization with metalocene catalysts (see U.S. Pat. No. 4,306,041), the copolymers of ethylene with other monomers, in particular with vinyl acetate, (EVA), wherein the ethylene units are present in an amount greater than those of vinyl acetate, and the blends thereof, in any proportion. Polyolefins also include metallocene polyethylene; polypropylene; polybutylene; polybutene-1; polypentene-1; poly-3-methylbutene-1; poly-4-methylpentene-1; and polyhexene. Copolymers of olefins and other polymers include such as polyvinyl chloride, polystyrene and polyurethane, etc., and mixtures of these. Of these, the preferred polyolefins are polyethylene and polypropylene.

Each of the nylon, ethylene vinyl alcohol film, polyolefin and adhesive layers may optionally also include one or more conventional additives whose uses are well known to those skilled in the art. The use of such additives may be desirable in enhancing the processing of the compositions as well as improving the products or articles formed therefrom. Examples of such include: oxidative and thermal stabilizers, lubricants, release agents, flame-retarding agents, oxidation inhibitors, dyes, pigments and other coloring agents, ultraviolet light absorbers and stabilizers, organic or inorganic fillers including particulate and fibrous fillers, reinforcing agents, nucleators, plasticizers, as well as other conventional additives known to the art. Such may be used in amounts of up to about 10% by weight of the overall composition. Representative ultraviolet light stabilizers include various substituted resorcinols, salicylates, benzotriazole, benzophenones, and the like. Suitable lubricants and release agents include stearic acid, stearyl alcohol, and stearamides. Exemplary flame-retardants include organic halogenated compounds, including decabromodiphenyl ether and the like as well as inorganic compounds. Suitable coloring agents including dyes and pigments include cadmium sulfide, cadmium selenide, titanium dioxide, phthalocyanines, ultramarine blue, nigrosine, carbon black and the like. Representative oxidative and thermal stabilizers include the Period Table of Element's Group I metal halides, such as sodium halides, potassium halides, lithium halides; as well as cuprous halides; and further, chlorides, bromides, iodides. Also, hindered phenols, hydroquinones, aromatic amines as well as substituted members of those above mentioned groups and combinations thereof. Exemplary plasticizers include lactams such as caprolactam and lauryl lactam, sulfonamides such as o,p-toluenesulfonamide and N-ethyl, N-butyl benylnesulfonamide, and combinations of any of the above, as well as other plasticizers known to the art.

An antifog composition is formed either on a surface of the polyolefin film or incorporated into the polyolefin film. Non-limiting examples of antifog compositions are glycerol monoesters of a saturated or unsaturated fatty acid having from about 8 to about 20 carbon atoms, glycerol diesters of a saturated or unsaturated fatty acid having from about 8 to about 20 carbon atoms; and anionic, cationic, nonionic and amphoteric surfactants. Suitable ionic surfactants have phosphate, sulfate or quaternary amine functional end groups. Other antifog compositions include sorbitan esters of aliphatic carboxylic acids, glycerol esters of aliphatic carboxylic acids, esters of other polyhydric alcohols with aliphatic carboxylic acids, polyoxyethylene compounds, such as the polyoxyethylene sorbitan esters of aliphatic carboxylic acids and polyoxyethylene ethers of higher aliphatic alcohols. Preferred antifog compositions are glycerol monooleate, glycerol monostearate and blends thereof. When the antifog composition is incorporated into the polyolefin film, it is blended into the polyolefin film composition in an amount of from about 0.1 weight percent to about 5 weight percent. When the antifog composition is coated on the polyolefin film it is preferably applied at a coating weight of from about 0.2 to about 0.6 g/m$^2$. Suitable antifog compositions are described, for example, in U.S. Pat. No. 5,766,772.

The polyolefin layer is attached to the composite by an intermediate adhesive or tie layer. Any suitable adhesive may be employed. Such adhesives include polyurethanes, epoxies, polyesters, acrylics, anhydride modified polyolefin and blends thereof. Modified polyolefm compositions have at least one functional moiety selected from the group consisting of unsaturated polycarboxylic acids and anhydrides thereof. Such unsaturated carboxylic acid and anhydrides include maleic acid and anhydride, fumaric acid and anhydride, crotonic acid and anhydride, citraconic acid and anhydride, itaconic acid an anhydride and the like.

The multilayer films of the present invention can be produced by laminating the polyolefin to the composite by the intermediate adhesive. Typically, laminating is done by positioning the individual layers on one another under conditions of sufficient heat and pressure to cause the layers to combine into a unitary film. Typically the composite, adhesive, and polyolefin layers are positioned on one another, and the combination is passed through the nip of a pair of heated laminating rollers by techniques well known in the art. Lamination heating may be done at temperatures ranging from about 120° C. to about 175° C., preferably from about 150° C. to about 175° C., at pressures ranging from about 5 psig (0.034 MPa) to about 100 psig (0.69 MPa), for from about 5 seconds to about 5 minutes, preferably from about 30 seconds to about 1 minute.

Although each layer of the multilayer film structure may have a different thickness, the thickness of each of the nylon layers of the films in the post-stretched multilayer film structure is from about 1 μm to about 10 μm, preferably from about 3 μm to about 8 μm, and more preferably from about 4 μm to about 6 μm. The thickness of the ethylene vinyl alcohol layer in the post-stretched multilayer films structure is from about 1 μm to about 10 μm, preferably from about 2 μm to about 8 μm and more preferably from about 3 μm to about 5 μm. The thickness of the polyolefin layer in the post-stretched multilayer films structure is from about 3 μm to about 50 μm, preferably from about 12 μm to about 30 μm, and more preferably from about 12 μm to about 20 μm. While such thicknesses are preferred, it is to be understood that other film thicknesses may be produced to satisfy a particular need and yet fall within the scope of the present invention.

Oxygen transmission rate (OTR) may be determined via the procedure of ASTM D-3985. In the preferred embodiment, the multilayered film according to this invention has an OTR of about 0.1 cc/100 in$^2$/day or less, preferably from about 0.085 cc/100 in$^2$/day or less and more preferably from about 0.07 cc/100 in$^2$/day or less at 65% relative humidity at 20° C.

The multilayered film of the invention is heat shrinkable, generally by an amount of from about 2% to about 30%, more preferably from about 10 to about 20% in its length, or its width or each of its length and width. To provide a tightly adhering lid for a tray, for example, the film only need to exhibit shrinkage on the order of about 2 to about 3%. However, in order to have the film also form (unrestrained) about the side of the tray, higher shrinkage in the film is desirable. The multilayered film may further have printed indicia between the polyolefin film and its attached nylon film. Since such printing is on an internal surface of the structure, it will not rub off when the surface is contacted. Optionally, the multilayered film may be uniaxially or biaxially oriented in a manner and in an amount indicated above for the composite film and is not heat set so that it is shrinkable both in its transverse and longitudinal directions. In this case the composite from which the multilayered film is formed may or may not have been oriented.

The film preferably has a puncture resistance of at least about 1600 grams as measured by ASTM F 1306. Preferably the film has a haze of about 5% or less as measured by ASTM D1003.

The multilayered film is useful for forming a food package including a container, such as a tray, having an open portion and the multilayered film sealing the open portion. Such a structure is generally referred to a lidding film. The multilayered film is positioned such that the antifog composition is adjacent to the open portion, that is, facing the inside of the container. Such containers are suitable for packaging a variety of raw meats such as beef, pork, poultry, and veal, among others. A packaged food may comprises the food package and a food product such as a meat in the food package.

The container may have enclosed side walls, a floor and an top opening defining a central cavity wherein the open top optionally has a substantially flat peripheral rim. The multilayered film surrounds the container and is heat shrunk and heated sealed to it via the polyolefin film such that the antifog composition is on the open portion (facing inward). The container may comprise a material such as cardboard, paperboard, boardstock, a plastic and combinations thereof. Preferred plastics include any one of several thermosetting or thermoplastic resins any of which are capable of sealing to the lidding material. Examples of materials include acrylonitrile, an acrylic polymer, polyethylene terephthalate (PET) or copolymers thereof, polyvinyl chloride, polycarbonate, polystyrene and polypropylene. In use the lidding film is positioned around the open portion and is caused to shrink, e.g. by the application of heat, a sufficient amount to seal the open portion of the container.

Although in the preferred embodiment the composite is a three layered structure for subsequent attachment to a polyolefin layer, e.g. nylon/EVOH/nylon, the invention further contemplates a composite which has additional layers, for example, nylon/adhesive/EVOH/adhesive/nylon; nylon/adhesive/oxygen barrier/adhesive/nylon. Further, the composite may be attached to the polyolefin layer by coextrusion, lamination, or coating by extrusion coating of the polyolefin with or without an intermediate adhesive.

It is within the contemplation of the invention that the multilayered film may comprise a shrinkable film attached to a surface of an oxygen barrier film and another shrinkable film attached to another surface of the oxygen barrier film to form a composite. Although in the preferred embodiment the composite is a three layered structure for subsequent attachment to a polyolefin layer, e.g. shrinkable film/oxygen barrier/shrinkable film, the invention further contemplates a composite which has additional layers, for example shrinkable film/adhesive/oxygen barrier/adhesive/shrinkable film. A polyolefin film is then attached to one of the shrinkable films by coextrusion, lamination, extrusion coating or via an intermediate adhesive, wherein an antifog composition is another surface of the polyolefin film or incorporated into the polyolefin film. Suitable shrinkable films include nylons, polyesters, oriented polyolefins, and combinations thereof. Suitable oxygen barrier films include ethylene vinyl alcohol, polyvinyl alcohol, polyvinylidine chloride and combinations thereof It is also within the contemplation of the invention that the multilayered film comprises a heat shrinkable film coated with an oxygen barrier coating and another heat shrinkable film attached to the oxygen barrier coating to form a composite. A polyolefm film is then attached to one of the heat shrinkable films via an intermediate adhesive wherein an antifog composition is on another surface of the polyolefin film or incorporated into the polyolefm film. Suitable heat shrinkable films are identified above. Suitable oxygen barrier coatings include ethylene vinyl alcohol, polyvinyl alcohol, polyvinylidene chloride and combinations thereof.

The following non-limiting examples serve to illustrate the invention.

EXAMPLE 1

A laminate for lidding applications was made by coating a 15 μm biaxially oriented nylon/EVOH/nylon coextruded film (reverse printed) with a two-component polyether-epoxy adhesive at a coat rate of 1.95 g/m$^2$ until substantially dry. The film was then joined to a 19 μm polyethylene film and laminated through a hot nip to create the finished laminate. The laminate was coated on the polyethylene side with an ethyl alcohol solution of an antifog agent (glycerol monostearate) at a coating weight of 0.36 g/m$^2$ and passed through an oven until substantially dry.

EXAMPLE 2

Example 1 was repeated except that the coextruded film was unprinted, the adhesive was a two-component adhesive consisting of a polyester polyol substrate and a diisocyanate co-reactant, and the coating weight of the antifog agent was 0.28 g/m$^2$. The results are shown in Table 1.

EXAMPLE 3

Example 2 was repeated except that the coextruded film was reverse printed and the coating weight of the antifog coating was 0.36 g/m$^2$. The results are shown in Table 1.

EXAMPLE 4

Example 2 was repeated except that a polypropylene film was used instead of the polyethylene film and the coating weight of the antifog agent was 0.33 g/m². The results are shown in Table 1.

TABLE 1

| Property | | EXAMPLE | | |
|---|---|---|---|---|
| | | 2 | 3 | 4 |
| Thickness (μm) | | 35.6 | 35.6 | 38.1 |
| Yield (m²/kg) | | 26.2 | — | 25.8 |
| Tensile Strength | TD | 77.3 | — | 127.0 |
| (MPa) | MD | 81.0 | — | 112.4 |
| Elongation (%) | TD | 42.81 | — | 87.93 |
| | MD | 66.68 | — | 94.07 |
| Puncture (kg) (ASTM 1306) | | 6.25 | — | 9.4 |
| Light Transmission (%) | | 93.2 | 93.4 | 94.3 |
| Haze level (%) | | 6.7 | 4.1 | 3.1 |
| Clarity* | | 87.1 | 89.9 | 92.6 |
| Oxygen Transmission Rate (cc/100 in²/day 65% RH and 20° C.) | | 0.07 | 0.07 | — |

*Using Byk Gardner HazeGard Plus Instrument

EXAMPLE 5

Films from Example 2 were used as lidding film to seal polyethylene trays with a meat patty inside. The heat seal conditions were 250° F. (121° C.) seal temperature and 350° F. (177° C.) knife temperature. The seal was good and there was no significant water condensation on the antifog coating.

EXAMPLE 6

Example 5 was repeated using films from Example 4 with polystyrene trays having a polyethylene sealant web, as well as polypropylene trays. The heat seal conditions were 330° F. (166° C.) seal temperature and 350° F. (177° C.) knife temperature. The seal was good and t here was no significant water condensation on the antifog coating.

EXAMPLE 7

Example 5 was repeated using films made from Example 3 with polystyrene trays having a polyethylene sealing web. The heat seal conditions were 275–300° F. (135–149° C.) seal and 300° F. (149° C.) knife. There was no significant water condensation on the antifog coating after 72 hours.

While the present invention has been particularly shown and described with reference to preferred embodiments, it will be readily appreciated by those of ordinary skill in the art that various changes and modifications may be made without departing from the spirit and scope of the invention. It is intended that the claims be to interpreted to cover the disclosed embodiment, those alternatives which have been discussed above and all equivalents thereto.

What is claimed is:

1. A multilayered film which consists essentially of a nylon film attached to a surface of an ethylene vinyl alcohol film and another nylon film attached to another surface of the ethylene vinyl alcohol film to form a composite; a surface of a polyolefin film attached to one of the nylon films via an intermediate adhesive, and an antifog composition on another surface of the polyolefin film or incorporated into the polyolefin film.

2. The multilayered film of claim 1 wherein the composite is biaxially oriented.

3. The multilayered film of claim 1 wherein the composite is biaxially oriented from about 1.5 to about 5 times in either or each of its longitudinal and transverse directions.

4. The multilayered film of claim 1 which is heat shrinkable.

5. The multilayered film of claim 1 which has a length and a width and which is shrinkable by an amount of from about 2% to about 30% in its length, or its width or each of its length and width.

6. The multilayered film of claim 1 wherein the nylon films are attached to the ethylene vinyl alcohol film by coextrusion and the polyolefin film is attached to one of the nylon films by lamination.

7. The multilayered film of claim 1 wherein the nylon film comprises nylon 6, nylon 66, nylon 6/66 or combinations thereof.

8. The multilayered film of claim 1 wherein the nylon film comprises nylon 6.

9. The multilayered film of claim 1 wherein the ethylene vinyl alcohol film comprises an ethylene vinyl alcohol polymer having a degree of hydrolysis of from about 85 to about 99.5 percent and from about 15 to about 65 mol percent ethylene.

10. The multilayered film of claim 1 wherein each nylon layer has a thickness of from about 1 μm to about 10 μm; wherein the ethylene vinyl alcohol film layer has a thickness of from about 1 μm to about 10 μm; and wherein the polyolefin film has a thickness of from about 3 μm to about 50 μm.

11. The multilayered film of claim 1 wherein the adhesive comprises a material selected from the group consisting of a polyurethane, an epoxy, a polyester, an acrylic, an anhydride modified polyolefin and blends thereof.

12. The multilayered film of claim 1 wherein the adhesive comprises a colorant, an ultraviolet light absorber or both.

13. The multilayered film of claim 1 wherein the antifog composition comprises one or more materials selected from the group consisting of glycerol monoesters of a saturated or unsaturated fatty acid having from about 8 to about 20 carbon atoms, glycerol diesters of a saturated or unsaturated fatty acid having from about 8 to about 20 carbon atoms; and ionic surfactants having phosphate, sulfate or quaternary amine functional end groups.

14. The multilayered film of claim 1 wherein the antifog composition comprises one or more materials selected from the group consisting of anionic, cationic, nonionic and amphoteric surfactants.

15. The multilayered film of claim 1 wherein the antifog composition comprises glycerol monooleate, glycerol monostearate or a blend thereof.

16. The multilayered film of claim 1 wherein the antifog composition is coated on the polyolefin film at a coating weight of from about 0.2 to about 0.6 g/m².

17. The multilayered film of claim 1 wherein the antifog composition is incorporated into the polyolefin film.

18. The multilayered film of claim 1 wherein the polyolefin film comprises a homopolymer or copolymer containing a low density polyethylene, linear low density polyethylene, metallocene polyethylene or polypropylene.

19. The multilayered film of claim 1 further comprising printed indicia between the polyolefin film and its attached nylon film.

20. The multilayered film of claim 1 which has an oxygen transmission rate of about 0.1 cc/100 in²/day or less.

21. A process for producing a multilayered film which consists essentially of coextruding A nylon film to a surface of an ethylene vinyl alcohol film and another nylon film to another surface of the ethylene vinyl alcohol film to form a composite; biaxially orienting the composite; laminating or coextruding a surface of a polyolefin film to one of the nylon films via an intermediate adhesive; and either applying an antifog composition onto another surface of the polyolefin film or incorporating an antifog composition into the polyolefin film.

22. The process of claim 21 wherein the antifog composition is applied onto the polyolefm film.

23. The process of claim 21 wherein the antifog composition is incorporated onto the polyolefin film.

24. The process of claim 21 wherein the composite is biaxially oriented from about 1.5 to about 5 times in each of the longitudinal and transverse directions.

25. The process of claim 21 wherein the nylon films are attached to the ethylene vinyl alcohol film by coextrusion and the polyolefin film is attached to one of the nylon films by lamination.

26. The process of claim 21 wherein the nylon film comprises nylon 6.

27. The process of claim 21 wherein the adhesive comprises a material selected from the group consisting of a polyurethane, an epoxy, a polyester, an acrylic, an anhydride modified polyolefin and blends thereof.

28. The process of claim 21 wherein the antifog composition comprises one or more materials selected from the group consisting of glycerol monoesters of a saturated or unsaturated fatty acid having from about 8 to about 20 carbon atoms, glycerol diesters of a saturated or unsaturated fatty acid having from about 8 to about 20 carbon atoms; and ionic surfactants having phosphate, sulfate or quaternary amine functional end groups.

29. The process of claim 21 wherein the antifog composition comprises one or more materials selected from the group consisting of anionic, cationic, nonionic and amphoteric surfactants.

30. The process of claim 21 wherein the antifog composition comprises glycerol monooleate, glycerol monostearate or a blend thereof.

31. The process of claim 21 wherein the antifog composition is coated on the polyolefin film at a coating weight of from about 0.2 to about 0.6 g/m$^2$.

32. The process of claim 13 wherein the polyolefin film comprises a homopolymer or copolymer containing a low density polyethylene, linear low density polyethylene, metallocene polyethylene or polypropylene.

33. A multilayered film which consists essentially of a shrinkable film attached to a surface of an oxygen barrier film and another shrinkable film attached to another surface of the oxygen barrier film to form a composite; a surface of a polyolefin film attached to one of the shrinkable films via an intermediate adhesive, and an antifog composition on another surface of the polyolefin film or incorporated into the polyolefin film.

34. The multilayered film of claim 33 wherein each shrinkable film is selected from the group consisting of nylons, polyesters, oriented polyolefins, and combinations thereof.

35. The multilayered film of claim 33 wherein the oxygen barrier film comprises ethylene vinyl alcohol.

36. A multilayered film which consists essentially of a shrinkable film coated with an oxygen barrier coating and another shrinkable film attached to the oxygen barrier coating to form a composite; a surface of a polyolefin film attached to one of the shrinkable films via an intermediate adhesive, and an antifog composition on another surface of the polyolefin film or incorporated into the polyolefin film.

37. The multilayered film of claim 36 wherein each shrinkable film is selected from the group consisting of nylons, polyesters, oriented polyolefins, and combinations thereof.

38. The multilayered film of claim 36 wherein the oxygen barrier coating comprises ethylene vinyl alcohol, polyvinyl alcohol, polyvinylidene chloride or combinations thereof.

* * * * *